(12) United States Patent
Ohsuge

(10) Patent No.: US 6,175,731 B1
(45) Date of Patent: Jan. 16, 2001

(54) RADIO COMMUNICATION APPARATUS AND CONTROL METHOD THEREFOR

(75) Inventor: Michihiro Ohsuge, Tokyo (JP)

(73) Assignee: NEC Corporation, Tokyo (JP)

(*) Notice: Under 35 U.S.C. 154(b), the term of this patent shall be extended for 0 days.

(21) Appl. No.: 08/975,190

(22) Filed: Nov. 20, 1997

(30) Foreign Application Priority Data

Nov. 29, 1996 (JP) .................................................. 8-319623

(51) Int. Cl.[7] .................................................. H04Q 7/20
(52) U.S. Cl. .......................... 455/426; 455/445; 455/437; 455/462; 379/279
(58) Field of Search .................................. 455/426, 436, 455/437, 438, 439, 445, 461, 552, 462–465, 450, 453, 454, 417, 434, 62, 509, 510, 513, 514, 515, 517, 556

(56) References Cited

U.S. PATENT DOCUMENTS

| | | | |
|---|---|---|---|
| 4,680,786 | * 7/1987 | Baker et al. ........................... | 455/461 |
| 4,754,479 | * 6/1988 | Bicknell et al. ...................... | 379/207 |
| 5,020,093 | * 5/1991 | Pireh ................................... | 455/552 |
| 5,384,827 | * 1/1995 | Orisaka .............................. | 455/464 |
| 5,454,027 | * 9/1995 | Kennedy et al. .................... | 455/461 |
| 5,465,397 | * 11/1995 | Pickert ................................ | 455/62 |
| 5,483,589 | * 1/1996 | Ishida et al. ........................ | 379/220 |
| 5,504,803 | * 4/1996 | Yamada et al. ..................... | 379/59 |
| 5,732,359 | * 3/1998 | Baranowsky, II et al. .......... | 455/552 |
| 5,774,805 | * 6/1998 | Zicker ................................. | 455/426 |
| 5,784,643 | * 7/1998 | Shields ............................... | 395/825 |
| 5,794,147 | * 8/1998 | Huang ................................ | 455/434 |
| 5,794,156 | * 8/1998 | Alanara .............................. | 455/517 |
| 5,832,379 | * 11/1998 | Mallinckrodt ....................... | 455/427 |
| 5,884,189 | * 3/1999 | Yamazaki et al. .................. | 455/552 |
| 5,887,259 | * 3/1999 | Zicker et al. ........................ | 455/434 |
| 5,901,357 | * 5/1999 | D'Avello et al. ..................... | 455/454 |
| 5,920,815 | * 7/1999 | Akhavan ............................. | 455/426 |

FOREIGN PATENT DOCUMENTS

| | | |
|---|---|---|
| 0383630 | 8/1990 | (EP) . |
| 4-123534 | 4/1992 | (JP) . |
| 4-335723 | 11/1992 | (JP) . |
| 4-351127 | 12/1992 | (JP) . |
| 5-327607 | 12/1993 | (JP) . |
| 6-284081 | 10/1994 | (JP) . |
| 6-296155 | 10/1994 | (JP) . |
| 6-296156 | 10/1994 | (JP) . |
| 6-303187 | 10/1994 | (JP) . |
| 7-30943 | 1/1995 | (JP) . |
| 7-177570 | 7/1995 | (JP) . |
| 7-212837 | 8/1995 | (JP) . |
| 8-307938 | 11/1996 | (JP) . |

* cited by examiner

*Primary Examiner*—Dwayne D. Bost
*Assistant Examiner*—Charles Craver
(74) *Attorney, Agent, or Firm*—Sughrue, Mion, Zinn, Macpeak & Seas, PLLC (57) ABSTRACT

In placing a call, a destination telephone number entered through the keyboard section 12 is saved in a storage device 10. A signal indicating that a line cannot be connected (BUSY signal) enters into a BUSY measurement section 13 from a base station through a radio section 2. When it continues for a predetermined period of time, a control section 8 automatically changes over the mode to another system mode, and automatically places a call to a telephone number saved in a storage device 10. Thus, a communication system in which a line is empty can be searched with single outgoing operation, so that operability is improved.

7 Claims, 7 Drawing Sheets

RADIO COMMUNICATION APPARATUS AND CONTROL METHOD THEREFOR

BACKGROUND OF THE INVENTION

1. Field of the Invention

The present invention relates to a radio communication apparatus, and, more particularly, to a movable or portable radio communication apparatus having communication capability with at least two communication systems.

2. Description of the Related Art

Conventional single radio telephone apparatus with two different communication capabilities includes, for example, a radio telephone apparatus described in Japanese Patent Application Laid-Open No. 7-177570 (hereinafter called the first reference).

The radio telephone apparatus described in the first reference has a cellular mode in the cellular system and a PHP mode in the personal handy phone (PHP). Either one mode is manually or automatically selected in use. For an incoming call, it is determined whether or not the incoming call is a PHP incoming call. If so, it is processed in a PHP system processing section. If not, it is processed in a cellular system processing section. On the other hand, for an outgoing call, radio wave from a PHP base station is measured for its intensity in response to an outgoing operation. It is determined from the result of measurement whether or not it is within a PHP service area. If not, it is notified to the user that the cellular mode is set. The user enters a telephone number after receiving the notification. On the contrary, if it is within a PHP service area, it is presented. Then, the user enters a telephone number after setting the PHP mode.

In addition, it is also disclosed that priority is previously set, that radio wave from a PHP base station is measured for its intensity after entering a telephone number in outgoing, that outgoing processing is performed in a PHP system processing section after setting the PHP mode if it is within a PHP service area, and that outgoing processing is performed in a cellular system processing section after setting the cellular mode if it is outside the PHP service area.

Thus, the radio telephone apparatus described in the first reference selects either one of the PHP mode or the cellular mode, and performs transmission by determining whether or not it is within a PHP service area by measuring intensity of radio wave from a PHP base station.

In addition, as a radio telephone apparatus for mode other than the PHP and cellular modes, for example, Japanese Patent Application Laid-Open No. 4-351127 (hereinafter called the second reference) describes a radio telephone apparatus that places an outgoing call by automatically changing over the mode between the cordless telephone mode and the portable telephone mode.

The radio telephone apparatus described in the second reference sends out a call request signal to a cordless telephone parent set in response to a calling operation by the user, and a dial signal to the cordless telephone parent set while fixing the mode at the cordless telephone mode when a call permission signal is received as a response signal from the cordless telephone parent set. On the other hand, if a call permission signal cannot be received, the mode is changed over to the portable telephone mode, and calling is made in the portable telephone mode.

The conventional radio telephone apparatus described above determines whether the telephone apparatus is within the service area of the system by measuring radio wave from a base station of one system, or detecting a call permission signal from a parent telephone set. If it is outside the service area, it is changed over to another system. Thus, the conventional radio telephone apparatus could automatically place an outgoing call to either one system by determining whether or not it is within the service area in outgoing.

However, the inventor of the present invention has first been aware of a problem when a line cannot be connected due to line congestion although the telephone apparatus is in the service area. That is, when a line cannot be connected although the apparatus is in the service area, changing-over cannot be automatically performed. Thus, it is necessary to manually change over the mode, and to enter a telephone number again.

In the current mobile communication, there is a possibility that connection cannot be established because a line becomes congested in some time zone as radio telephone terminals are rapidly spread. In such case, if changing-over is manually performed every time, operability is poor, and it is very inconvenient for the user.

In addition, when the circuit is disconnected as the user moves outside the service area during calling, or in other abnormal disconnection, it is necessary to manually change over the mode if calling can be performed on another system, and to enter a telephone number again. It makes operability very poor.

SUMMARY OF THE INVENTION

An object of the present invention is to provide an improved radio communication apparatus which can solve the above-mentioned problems.

Another object of the present invention is to provide a radio communication apparatus which can solve the above-mentioned problems, accommodate a plurality of communication systems, and, when it cannot perform communication on one system, be automatically changed over to another system.

Still another object of the present invention is to provide a radio communication apparatus which can solve the above-mentioned problems, and has improved operability.

Yet another object of the present invention is to provide a radio communication apparatus which can accommodate a plurality of communication systems, and be automatically changed over to a system depending on line use or connection state when a call is made on another system.

Still another object of the present invention is to provide a radio communication apparatus which can be changed over to another system in disconnection of a line during calling or the like.

Still another object of the present invention is to provide a radio communication apparatus which does not require operation by the user when systems are automatically changed over.

Still another object of the present invention is to provide a radio communication apparatus which can automatically convert difference of telephone numbers in different systems.

To attain above objects, the radio communication apparatus according to the present invention can accommodate a plurality of communication systems, determines use or connection status of a line in one of a plurality of systems, and determines whether or not automatic changing-over to another system is performed depending on use or connection status of the line.

Preferably, when use or connection status of a line is determined to be congestion, changing-over may be automatically performed to another system.

Determination on use or connection status of a line may be determination on whether or not the line is in congestion in placing a call.

In addition, determination on use or connection status of a line may be determination on disconnection of a line during communication.

Disconnection of a line during communication is preferably to be disconnection when the apparatus moves outside a service area, or abnormal disconnection.

A plurality of communication systems preferably are at least two of a personal handy phone system (PHS), a cellular phone system, a cordless telephone system, a car telephone system, a bidirectional pager, and an electronic notebook with radio communication function.

In addition, it preferably comprises means for storing telephone numbers, wherein a call is automatically placed to a stored telephone number in changing-over.

Furthermore, when different telephone numbers are provided for different communication systems, it preferably comprises means for automatically changing the telephone number when systems are automatically changed over.

As described, since the radio communication apparatus according to the present invention can be changed over to another system according to use or connection status of a line, an empty line can be searched in a plurality of systems with a single outgoing operation.

BRIEF DESCRIPTION OF THE DRAWINGS

These and other objects, features and advantages of this invention will become more fully apparent from the following detailed description taken with the accompanying drawings in which.

In the drawings, the same reference numerals denote the same structural elements

DESCRIPTION OF THE PREFERRED EMBODIMENTS

Now, the present invention is described in detail with reference to the drawings.

Figure 1:
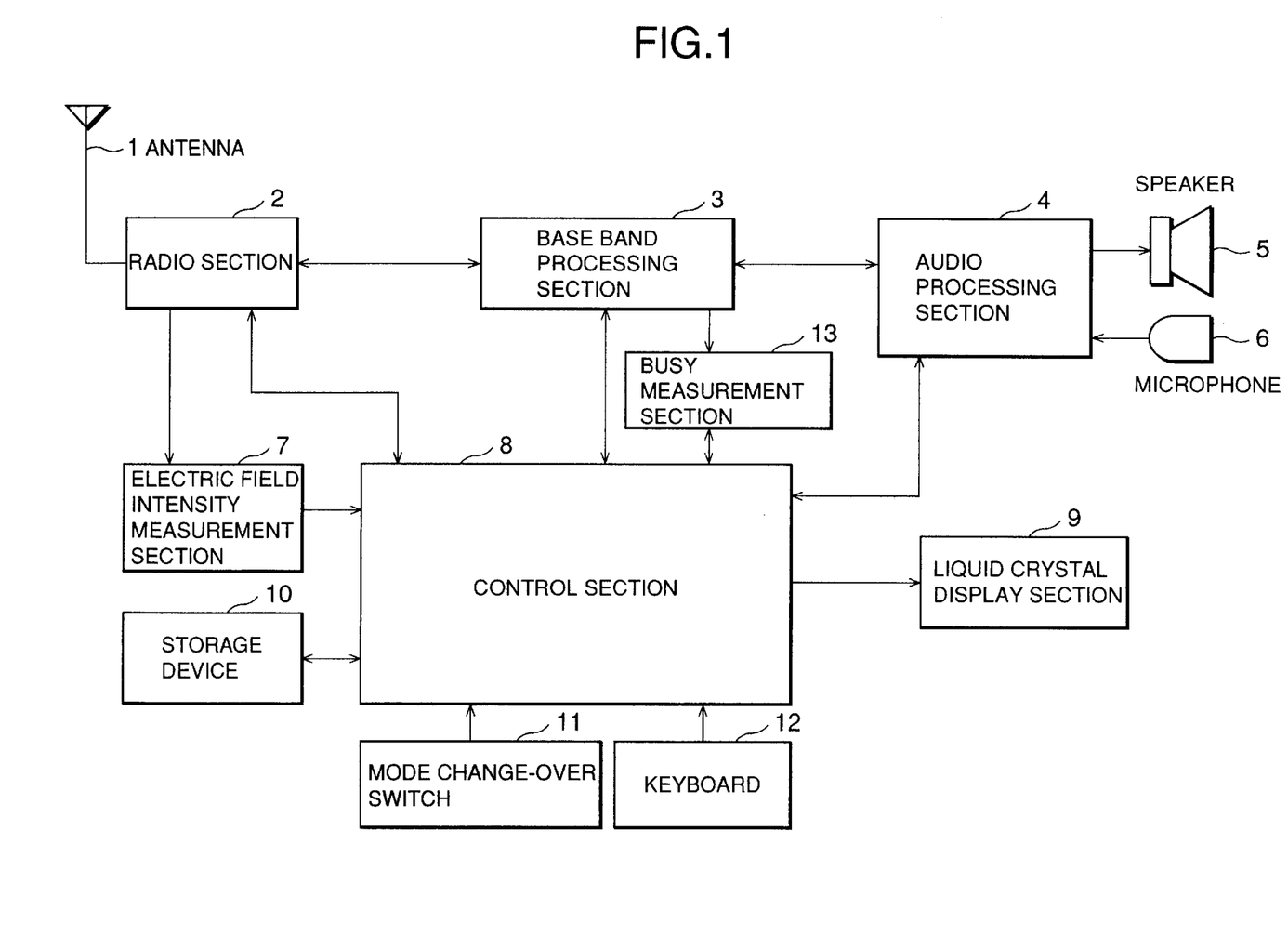
FIG. 1 is a block diagram showing the arrangement of a preferred embodiment of the present invention.

FIG. 1 is a block diagram showing the arrangement of a preferred embodiment of the present invention.

Referring to FIG. 1, a radio communication apparatus comprises an antenna 1, a radio section 2, a base band processing section 3, an audio processing section 4, a speaker 5, a microphone 6, an electric field intensity measurement section 7, a control section 8, a liquid crystal display section (hereinafter called an LCD) 9, a storage device (hereinafter called a memory) 10, a mode change-over switch 11, a keyboard section 12 having ten-keys, function keys or the like, and a BUSY measurement section (hereinafter called BUSY measurement section) 13.

The key board section 12 does not necessarily have the ten-keys or functions keys, is sufficient to have switches or buttons which can be operated for various operations. In addition, the mode change-over section 11 may be a button contained in the keyboard section 12.

When a signal is received, the radio section 2 accepts a signal received through the antenna 1, preferably, a signal from a base station (not shown) or a signal from a parent telephone set (not shown), and performs amplification of the accepted signal or frequency conversion. The base band processing section 3 decodes the frequency converted signal by the radio section 2, the audio processing section 4 converts a base band signal from the base band processing section 3 into an audio signal, and the speaker 5 outputs sound.

On the other hand, when a signal is transmitted, the audio processing section 4 converts sound from the microphone 6 into a base band signal, and the base band processing section 3 modulates the base band signal. The radio section 2 frequency converts the modulated base band signal from the base band processing section 3, and amplifies and outputs it through the antenna 1.

The electric field intensity measurement section 7 measures electric field intensity of the signal received by the radio section 2. The LCD 9 is to display an entered telephone number, a received destination telephone number, the current communication mode, or the like. The memory 10 is to store telephone numbers and current communication modes.

The mode change-over switch 11 is to set a communication mode, or to manually change over the communication mode. The keyboard section 12 is to enter a telephone number. The keyboard section 12 is used for other various operation, but, since they are not related to the present invention, their detailed description is omitted.

The BUSY measurement section 13 is to detect a case where a line cannot be connected when it is intended, or, to preferably detect a case where congestion is indicated, and measures a BUSY signal which is sent out from a base station or a parent telephone set when a line cannot be connected. Desirably, it measures whether or not the BUSY signal is continuously received for a predetermined period of time.

The control section 8 is to control various components in the radio communication apparatus, detailed description on the operation of which is omitted.

While FIG. 1 shows the antenna 1, the radio section 2, the base band processing section 3 and the audio processing section 4 in one constitution block as they are commonly used for a plurality of systems, they may be sufficient to be independently formed if they cannot be commonly used.

For example, when the present invention is applied to two radio telephone systems in Japan of the digital cellular system (hereinafter called PDC) and the personal handy phone system (hereinafter called PHS), these components can be commonly used if they can be commonly used by changing outgoing or tuning frequencies in response to changing-over between the PDC and PHS modes.

Figure 2:
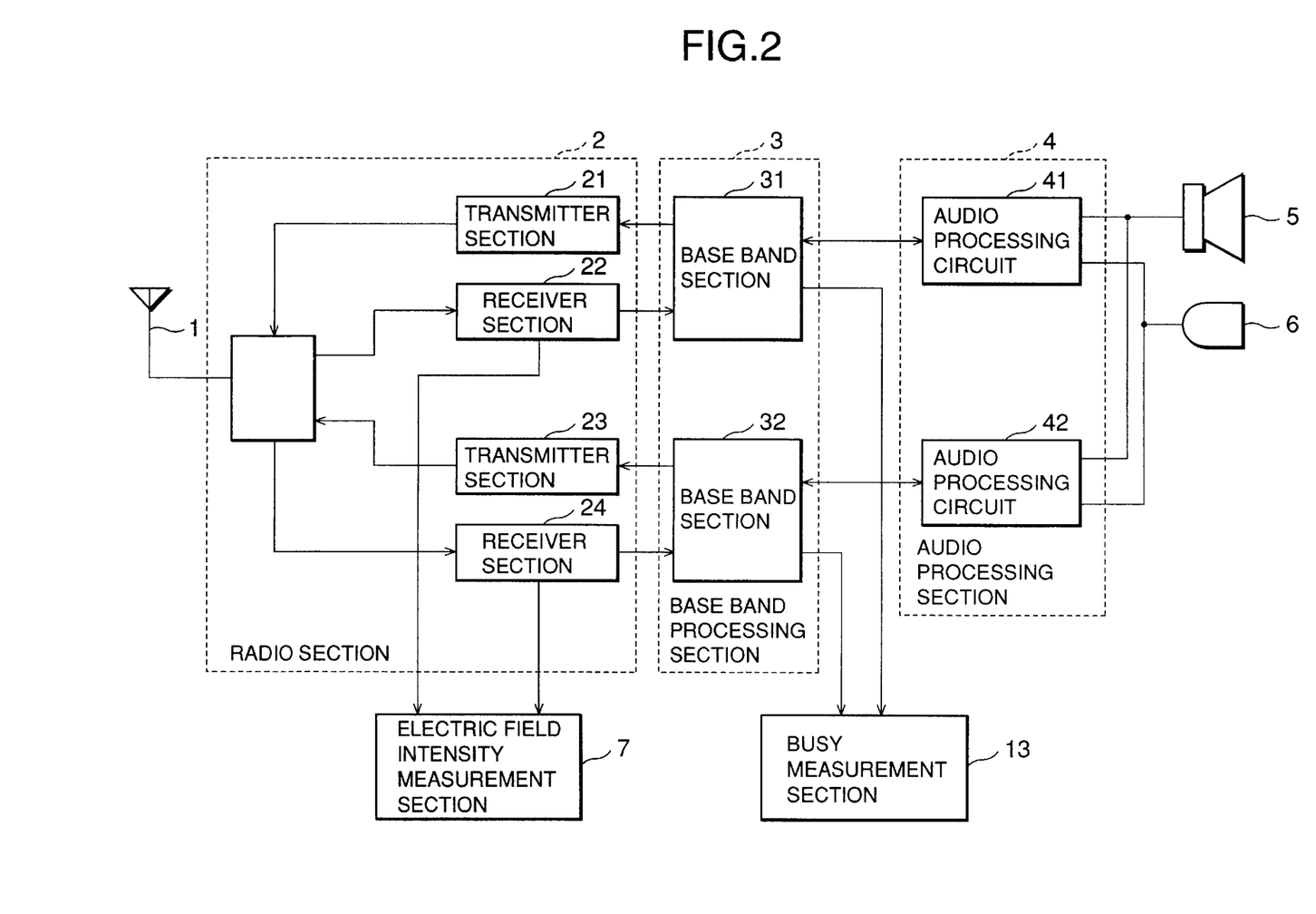
FIG. 2 is a block diagram showing a part of the arrangement of an alternative preferred embodiment of the present invention.

If they cannot be commonly used for different communication systems, they are sufficient to be independently constituted as shown in FIG. 2.

Referring to FIG. 2, the radio section 2 has a first transmitter section 21, a first receiver section 22, a second transmitter section 23, a second receiver section 24, and an antenna switching unit 25. The first transmitter section 21 and the first receiver section 22 belong to a first communication system, while the second transmitter section 23 and the second receiver section 24 belong to a second communication system. The base band processing section 3 has a first base band section 31 and a second base band section 32, while the audio processing section 4 has a first audio processing circuit 41 and a second audio processing circuit 42. Thus, different communication arrangements are independently arranged for different communication systems, respectively.

While FIG. 2 shows a case where the present invention is applied to two communication systems, the present invention can be applied not only to two communication systems, but also to three or more communication systems. In such case, those commonly used are commonly used, and, for those not commonly used, it is sufficient to provide communication arrangements by that number.

The communication system is not limited to PHS and PDC as described above, but is also contemplated to include other automobile telephone systems, a bidirectional pager, a cordless telephone system, and an electronic notebook with radio communication function. It is preferable to use at least two of these communication systems.

Returning to FIG. 1, in such arrangement, when a BUSY signal is measured when a circuit is connected or an outgoing call is placed, the present invention automatically change over the system to another system. In such case, it is preferable to automatically send out a telephone number stored in the memory 10 to another system. In addition, it may be arranged that, when the electric field intensity measured by the electric field intensity measurement section 7 is at or higher than a predetermined reference level, and a BUSY signal is received, the system is automatically changed over to another system.

While the BUSY measurement section is used as means for determining congestion of circuit, it is not limited to such means, but may be to change over to another system when there is no response signal from the base station or parent telephone set although the electric field intensity from the base station or parent telephone set is at or above a reference value.

Now, the outgoing operation of an embodiment shown in FIG. 4 of the present invention is described with reference to FIG. 3.

Figure 3:
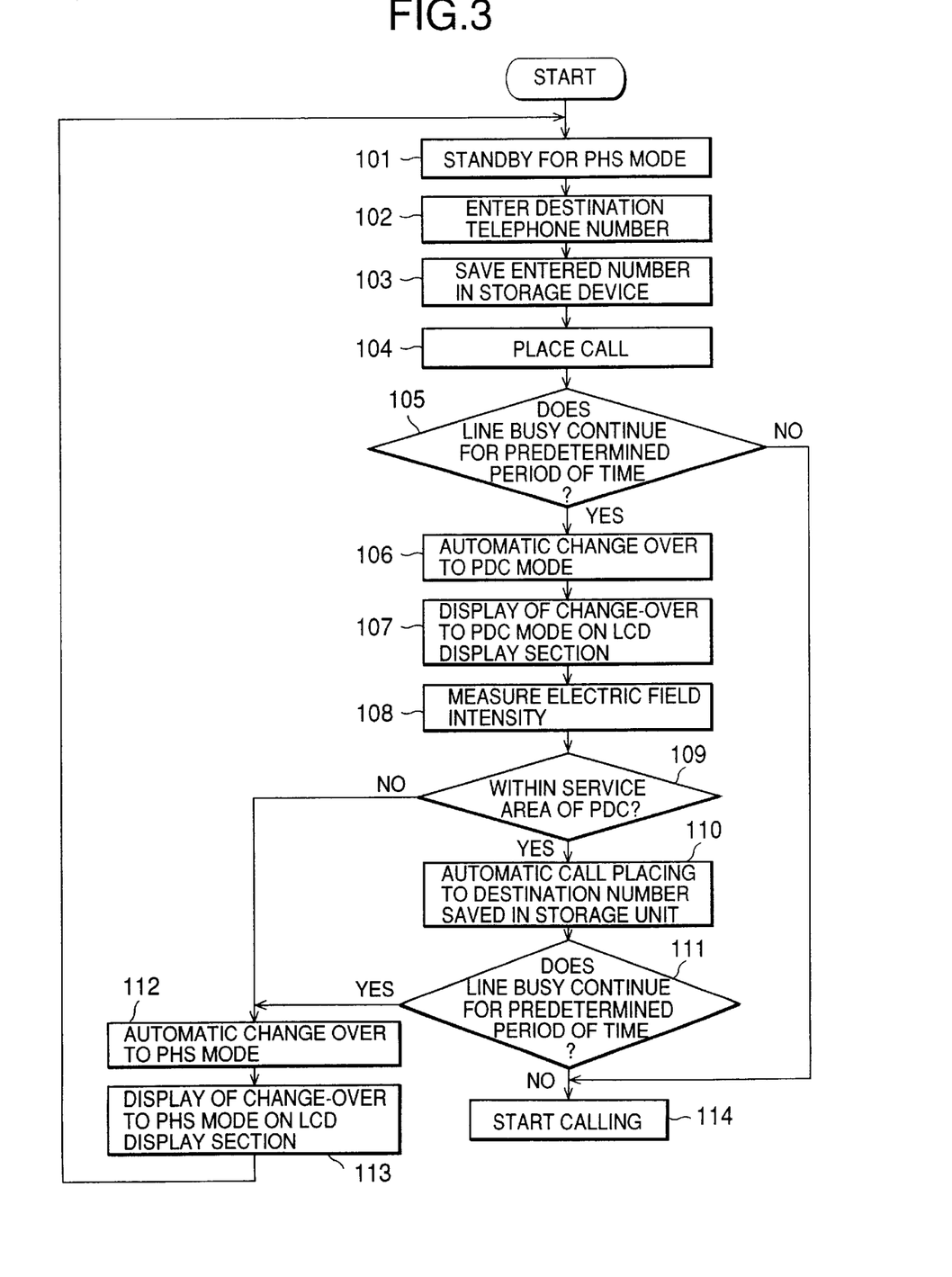
FIG. 3 is a flowchart illustrating the changing-over operation during outgoing of the preferred embodiment of the present invention shown in FIG. 1.

Referring to FIG. 3, description is given by assuming that the communication systems are two systems of PHS and PDC, and that the mode is set to the PHS mode with the mode change-over switch 11.

In waiting in the PHS mode set by the mode change-over switch 11 (step S 101), if a destination telephone number is entered for outgoing through the keyboard section 12, or read from those previously stored in the memory 10 through the operation of the keyboard section 12 (step S 102), the control section 8 saves the entered destination telephone number in the memory 10 (step S 103). In addition, when it is read from the memory 10, it is temporarily saved in a region in the memory 10.

Subsequently, an outgoing signal to the entered or read destination telephone number is transmitted from the control section 8 through the base band processing section 3, the radio section 2 and the antenna 1 (step S 104).

A base station or a parent telephone set receiving the outgoing signal sends out a signal for assigning a circuit. However, if a circuit cannot be assigned due to line congestion, it sends out a busy signal. If the busy signal is not received for a predetermined continuous period of time (step S 105, No), it starts service (step S 114).

On the other hand, when the BUSY measurement section 13 continuously measures the busy signal for a predetermined period of time (step S 105, Yes), it sends out to the control section 8 a signal indicating that a line cannot be established. When the control section 8 receives the signal indicating that the line cannot be established, it automatically changes over the mode from the PHS mode to the PDC mode (step S 106), and displays the fact on the LCD 9 (step S 107).

Then, the electric field intensity measurement section 7 measures an electric field intensity of a signal from a PDC base station (step S 108) to determine whether or not the telephone set is within a service area of the PDC system (step S 109). That is, it is determined whether or not the electric field intensity is at or above a predetermined reference value. If it is not within a service area of the PDC system, the control section 8 automatically changes over the mode to the PHS mode again (step S 112), and displays the fact on the LCD 9 (step S 113).

On the other hand, if it is within a service area of the PDC system, the control section 8 automatically sends out the destination telephone number saved in the memory 10 (step S 110), and determines the use status of circuit (step S 111). If a busy signal is continuously measured for a predetermined period of time as in the processing in step S 105, the process proceeds to the processing in step S 112, and automatically changes over the mode to the PHS mode. Otherwise, it starts a call (step S 114).

While the embodiment assumes that the PHS mode is set, it is sufficient to replace the PHS mode with the PDC mode when transmission is performed in the PDC mode.

In addition, the embodiment described above performs change-over when a busy signal is received. It is not limited to such, but may perform change-over when a response signal is not received for a calling signal.

As described, the present invention determines whether or not the system is changed over to another system in response to a use status of circuit when the circuit is connected, automatically changes over to another system when it is determined to be changed over, and determines the use status of circuit on the other system. In addition, in the automatic change-over, trouble of reentering is eliminated by utilizing a telephone number saved in the memory.

Now, another embodiment of the present invention is described with reference to FIG. 4.

Figure 4:
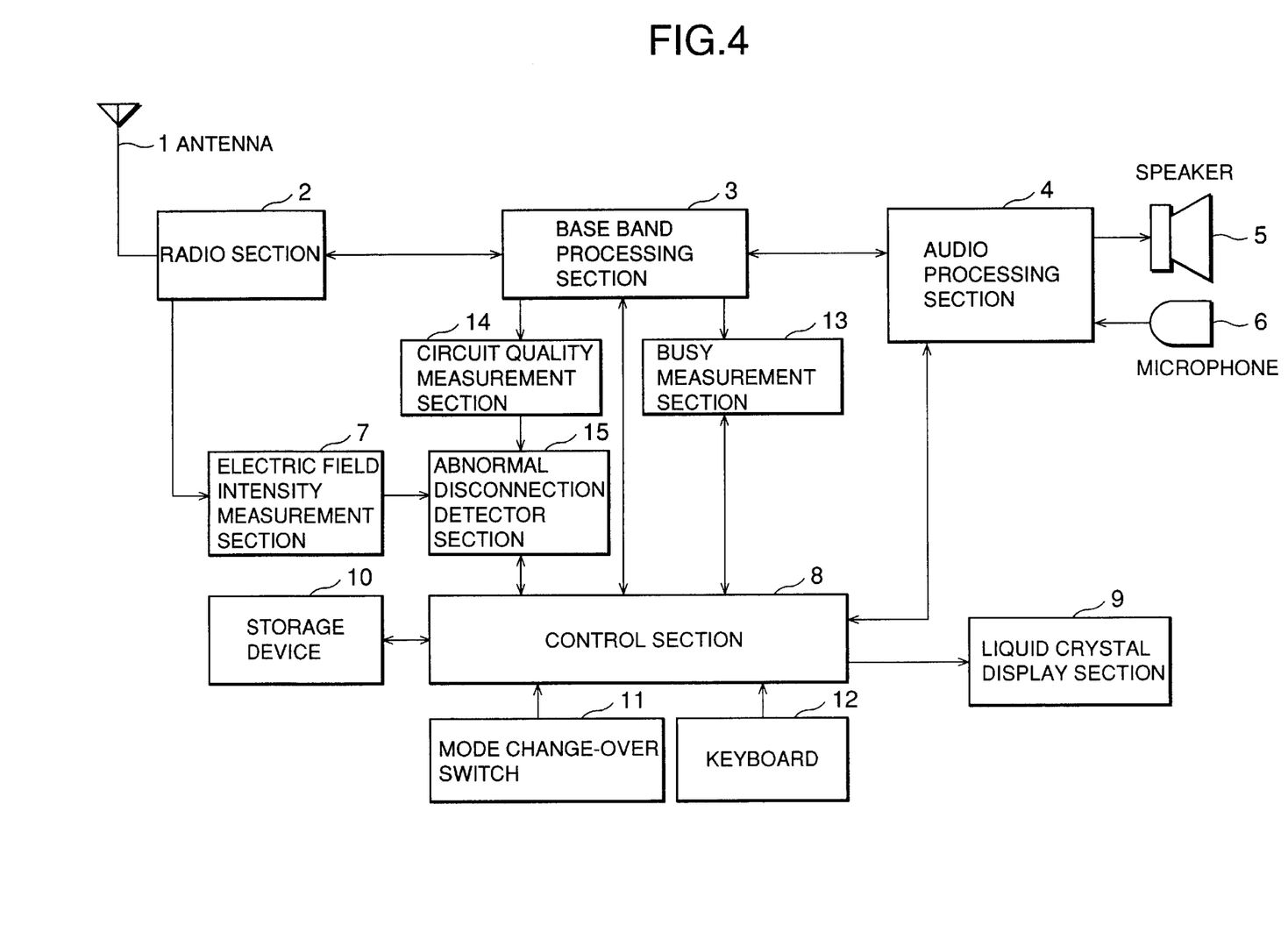
FIG. 4 is a block diagram showing the arrangement of another preferred embodiment of the present invention.

In FIG. 4, components with the same functions as FIG. 1 are denoted by the same reference numerals. In addition, description is only given on components different from those in FIG. 1 to avoid redundancy.

Referring to FIG. 4, the radio communication apparatus further comprises a circuit quality measurement section 14 and an abnormal disconnection detector section 15.

The circuit quality measurement section 14 is to measure quality during communication, and, preferably to measure quality by detecting phase shift in received data.

The abnormal disconnection detector section 15 is to detect abnormal disconnection due to deterioration of communication environment of the calling apparatus during call. When the call is disconnected, the apparatus checks the electric field intensity just before disconnection measured by the electric field intensity measurement section 7, and the circuit quality measured by the circuit quality measurement section 14, if at least one of them is deteriorated by a predetermined value or more, determines that disconnection occurs due to deterioration of communication status for the terminal of the calling apparatus rather than the destination terminal, and sends out a system change-over signal to the control section 8. Here, it is assumed that information on the electric field intensity and the circuit quality is internally stored.

The present invention measures circuit quality and electric field intensity during a call, detects disconnection of circuit by dropping of quality or intensity immediately before disconnection, and automatically changes over the system to another system. In automatic changing over, a call may be automatically placed with a saved telephone number.

While both circuit quality and electric field intensity are detected, either one may be sufficient, or change-over may be performed according to deterioration of both.

Now, operation of the embodiment shown in FIG. 4 is described with reference to FIG. 5.

Figure 5:
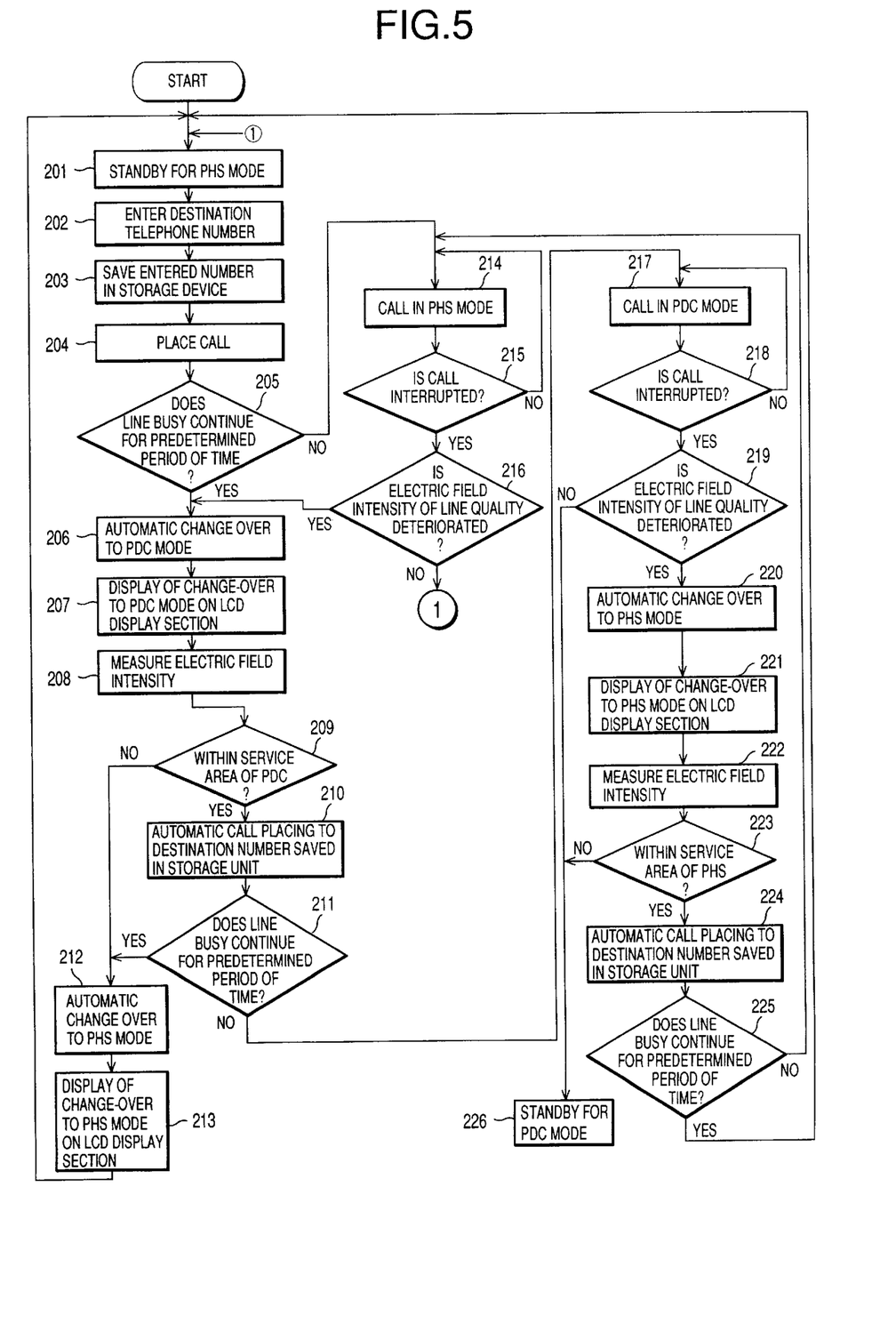
FIG. 5 is a flowchart illustrating a preferred changing-over operation during calling of the present invention shown in FIG. 4.

In FIG. 5, the outgoing operation from step S 201 through step S 213 corresponds to that of steps S 101 through S 113 shown in FIG. 1, respectively, is similar to that, so that description on it is omitted to avoid redundancy.

When a circuit is connected by process of step S 205, the process proceeds to a call in the PHS mode (step S 214). If the call is interrupted by some reason during the call in the PHS mode, that is, if it is not normal termination of call (step S 215, Yes), the abnormal disconnection detector section 15 checks the received electric field intensity and circuit quality immediately before disconnection of a call (step S 216), if both are not deteriorated by a predetermined value or more (step S 216, No), determines that the communication state of the destination is deteriorated, and causes the state to proceed to a standby state in the PHS mode in the process of step S 201.

On the other hand, if data for at least one of the electric field intensity and circuit quality immediately before disconnection is deteriorated by a predetermined value or more (step S 216, Yes), the mode is automatically changed over to the PDC mode (step S 206). Then, change-over of the mode is displayed on the LCD, the electric field intensity is measured, and, if it is outside a service area of the PDC system, the mode is automatically changed over to the PHS mode again, and the apparatus becomes the standby state. If it is within a service area of the PDC system, a call is automatically placed for a destination telephone number saved in the memory. If a circuit is in congestion, the mode is automatically changed over to the PHS mode. Otherwise, the state proceeds to a call state in the PDC mode (steps S 207 through S 213, and S 201).

Then, when the process in step S 211 causes the state to proceed to a call in the PDC mode (step S 217), and if the call is disconnected due to some reason during the call, that is, if it is not normal termination of call (step S 218, Yes), the abnormal disconnection detector section 15 checks the received electric field intensity and quality of circuit immediately before the call disconnection (step S 219), if both are not deteriorated by a predetermined value or more (step S 219, No), determines that the communication state of the destination is deteriorated, and causes the state to proceed to a standby state in the PDC mode (step S 226).

On the other hand, if data for at least one of the electric field intensity and circuit quality immediately before disconnection is deteriorated by a predetermined value or more (step S 219, Yes), the mode is automatically changed over to the PHS mode (step S 220), and the fact is displayed on the LCD 9 (step S 221).

Then, the electric field intensity measurement section 7 measures the electric field intensity of a signal from the PHS base station (step S 222) to determine whether or not it is within a service area of the PHS system (step S 223). That is, it is determined whether or not the electric field intensity is at or higher than a predetermined reference value. If it is not within a service area of the PHS system, the control section 8 automatically changes over the mode to the PDC mode again (step S 226).

On the other hand, if it is within a service area of the PHS system, the control section 8 automatically sends out a destination telephone number saved in the memory 10 (step S 225), and determines the use state of circuit (step S 201). When a busy signal is continuously measured for a predetermined period of time, the process proceeds to the process of step S 201, and causes the state to proceed to the standby state in the PHS mode (step S 201).

While the embodiment described above is applied to a case where a call is placed from the radio communication apparatus of the present invention, it can be applied to a case where a call is started for an incoming call from the other party.

In addition, if it is a system for which the telephone number of the calling party is notified from a circuit even if the call is placed by the other party, as in the digital cellular system, it is possible to automatically place a call at the time of system change-over by saving the telephone number of the calling party when a call is received.

Another embodiment is described in detail with reference to FIGS. 6 and 7.

Figure 6:
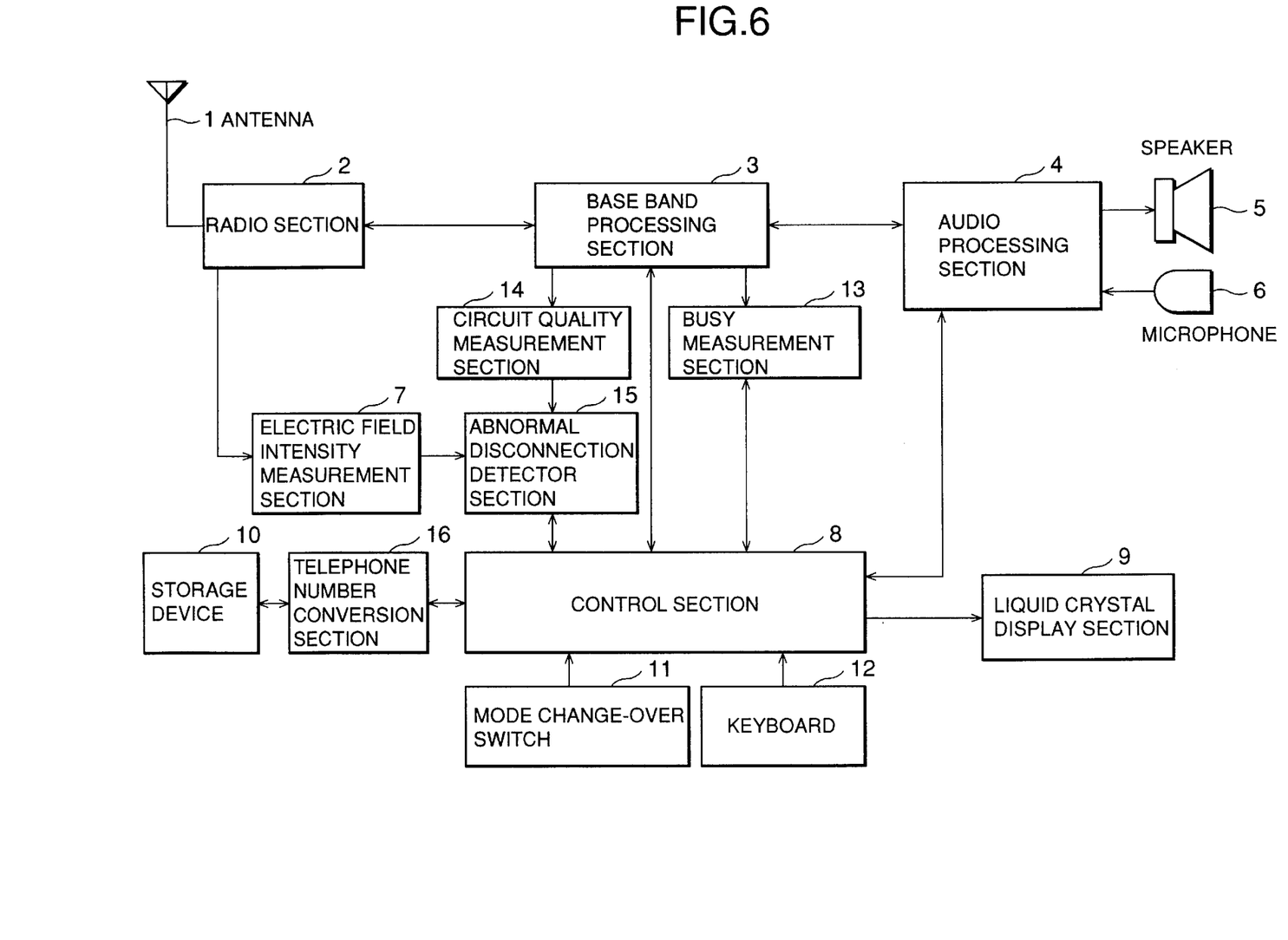
FIG. 6 is a block diagram showing the arrangement of still another preferred embodiment of the present invention.

In FIG. 6, a difference from the embodiment shown in FIG. 4 lies in that, in addition to the arrangement shown in FIG. 4, it comprises a telephone number conversion section 16 as means for absorbing differences in method when each system employs different methods for entering a telephone number.

For example, it is assumed that a telephone number when a call is placed to a destination PDC in the PDC mode is 0X0-XX-XXXXX. In the embodiment described above saves the number in the storage device, and places a call. If a circuit of PDC system is unavailable due to congestion, the apparatus automatically changes over the system to the PHS system, and replaces a call to a saved telephone number.

However, when a call is placed from a PHS system to a PDC terminal, it is arranged that connection cannot be established unless a number of a connection provider is once entered, and then the number of the portable set of the other party is entered. For example, in the above example, it is ??-????-????-*-0X0-XX-XXXXX.

Here, ??-????-???? is the telephone number of the connection provider who provides connection between different systems. The number of the portable set is entered after appending it to the top.

Thus, when the system mode is changed over, there may be a case where the destination telephone number is necessary to be changed.

Figure 7:
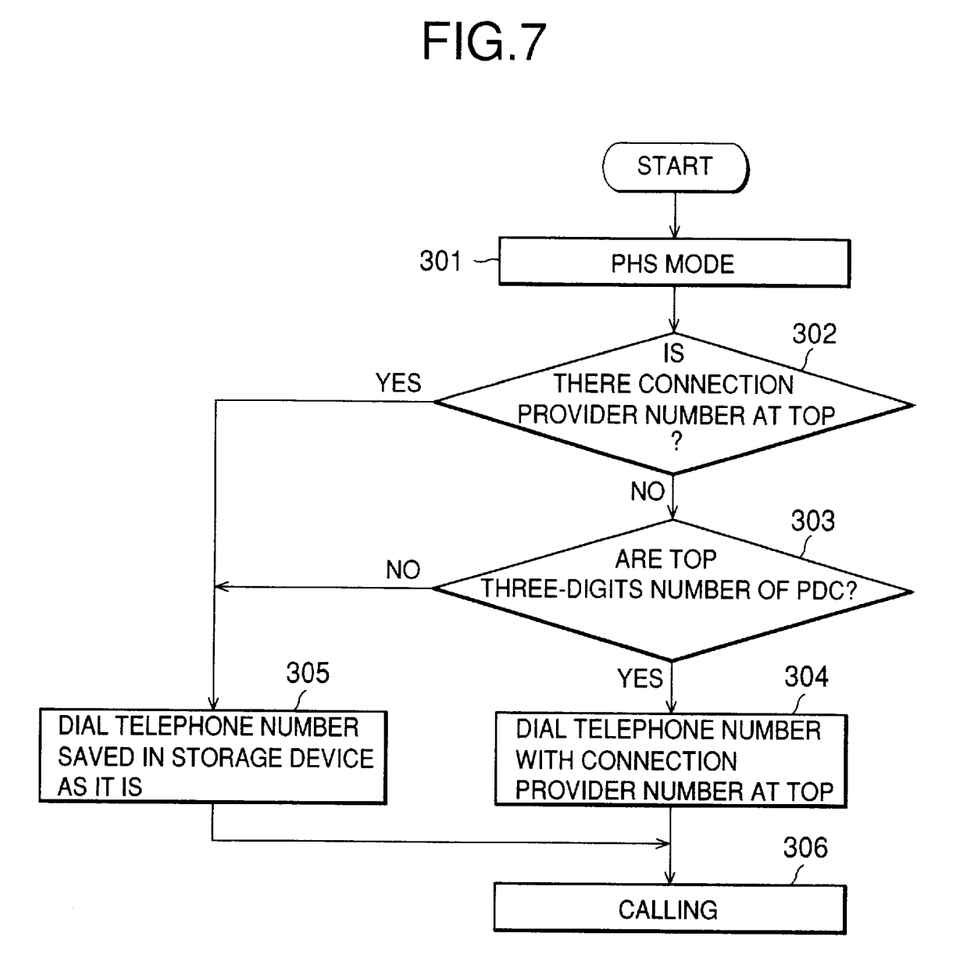
FIG. 7 is a flowchart illustrating a preferred operation of the present invention shown in FIG. 6.

Then, in the embodiment, the telephone number conversion section 16 preferably performs the operation indicated by the flowchart of FIG. 7.

The current system mode is notified by the control section 8. When it is the PHS mode (step S 301), it is checked whether or not the number of the connection provider is appended to the top of a number saved in the storage device 10 (step S 302). If there is the number of the connection provider, it is determined to be a call from PHS to PDC, and the number in the storage device is dialed as it is (step S 305). On the other hand, if there is no number of the connection provider, it is checked whether or not the top three digits are a number used by the PDC system such as 030 or 080 (step S 303). If it is a number of PDC, a conversion is performed to append the number of the connection provider at the top of the number before dialing (step S 304), and a call is started (step S 306). If the top three digits are not a number indicating PDC, it is determined to be a number of PHS or wire telephone, a number in the storage device is dialed as it is (step S 305), and a call is started.

Such conversion of number may be processed by software for a microcomputer in the control section 8.

In addition, communication between different systems may have different tariff system. In such case, there may arise a trouble when automatic change-over is performed as in this embodiment. Thus, the function of the embodiment may be established for use or non-use for preference of the user by the keyboard section 12.

As described above, since the present invention comprises means for detecting a state where a circuit cannot be connected, and means for automatically changing over the system mode, it is possible to automatically change over the system to another system and to place a call even if communication cannot be established due to circuit congestion of one system. In addition, it comprises means for storing an entered destination telephone number, and means for automatically placing a call to a stored telephone number, so that it is possible to search a system with which communication can be performed with a single outgoing operation, whereby the operability is improved.

Furthermore, it comprises means for detecting abnormal interruption of call, and means for automatically changing over the system mode in the abnormal interruption of call, so that the mode can be automatically changed over to another mode even when a call is interrupted because the user moves out of a service area during the call to place a call again, whereby the operability is improved.

Furthermore, even if the method for entering a destination telephone number differs from a system to another, the number can be automatically converted and a call can be automatically placed.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A radio communication apparatus being capable of accommodating at least a first and second communication system, comprising:

a transmitter for transmitting a call signal for connecting a line to the first communication system;

a receiver for receiving a line connection unallowable signal from the first communication system, the line connection unallowable signal being received in response to the call signal and indicative that the line cannot be assigned;

a change-over unit for changing over from the first communication system to the second communication system with which the radio communication apparatus shall communicate when the line connection unallowable signal is received by said receiver, whereby said transmitter transmits the call signal to the second communication system;

an operator unit for inputting a first telephone number, whereby the call signal is transmitted to the first communication system;

a memory for storing the first telephone number;

a reader unit for reading the first telephone number from said memory when a changing-over from the first communication system to the second communication system is performed by said change-over unit, whereby the call signal is transmitted to the second communication system from said transmitter; and a converter for converting the first telephone number stored in said memory into a second telephone number for said second communication system when the call signal to said second communication system is to be transmitted.

2. The apparatus as set forth in claim 1, further comprising a detector for detecting disconnection of a line during calling.

3. The apparatus as set forth in claim 2, wherein said disconnection of line during calling is determined depending on detected electric field intensity and line quality.

4. The apparatus as set forth in claim 3, wherein said change-over means performs change-over when the value of at least one of said received electric field intensity and said line quality immediately before line disconnection is deteriorated by a predetermined value or more.

5. The apparatus as set forth in claim 1, wherein said at least first and second communication systems are different form each other and each of said first and second communication systems is one of a personal handy phone system (PHS), a cellular phone system, a cordless telephone system, a car telephone system, a bidirectional pager system, and a radio communication system for an electronic notebook.

6. A method for selecting connection of communication systems for a radio communication apparatus being capable of accommodating at least a first communication system and a second communication system, said method comprising:

transmitting a call signal to said first communication system;

receiving a line connection unallowable signal from the first communication system, the line connection unallowable signal being received in response to the call signal and indicative that a line cannot be assigned;

automatically changing over from the first communication system to said second communication system with which the radio communication apparatus shall communicate when the line connection unallowable signal is received;

transmitting the call signal to the second communication system when a change over from the first communication system to the second communication system is performed;

inputting a first telephone number, whereby the call signal is transmitted to the first communication system;

storing the first telephone number in a memory in the radio communication apparatus;

reading the first telephone number from said memory when a change-over from the first communication system to the second communication system is performed, whereby the call signal is transmitted to the second communication system; and automatically converting the first telephone number into a second telephone number for said second communication system when the call signal is transmitted to said second communication system, and when said first and second communication systems have different telephone numbering systems.

7. The method as set forth in claim 6 further comprising:

detecting disconnection of a line during calling; and automatically changing over from said first communication system to said second communication system if said disconnection of the line is caused by deterioration of line quality at the calling set.

\* \* \* \* \*